US012797295B2

(12) United States Patent
Hamel et al.

(10) Patent No.: US 12,797,295 B2
(45) Date of Patent: Nov. 17, 2026

(54) FLUID TRANSFER DEVICE

(71) Applicant: SEPTODONT HOLDING, Saint-Maur-des-Fossés (FR)

(72) Inventors: Simon Hamel, Knowlton (CA); Marie Lafontaine Lacasse, Bromont (CA)

(73) Assignee: SEPTODONT HOLDING, Saint-Maur-des-Fossés (FR)

( * ) Notice: Subject to any disclaimer, the term of this patent is extended or adjusted under 35 U.S.C. 154(b) by 763 days.

(21) Appl. No.: 17/294,078

(22) PCT Filed: Nov. 15, 2019

(86) PCT No.: PCT/CA2019/000157
§ 371 (c)(1),
(2) Date: May 14, 2021

(87) PCT Pub. No.: WO2020/097715
PCT Pub. Date: May 22, 2020

(65) Prior Publication Data

US 2022/0008293 A1 Jan. 13, 2022

(30) Foreign Application Priority Data

Nov. 16, 2018 (CA) ................................ CA 3024462

(51) Int. Cl.
*A61J 1/20* (2006.01)
*A61J 1/14* (2023.01)

(52) U.S. Cl.
CPC ............. *A61J 1/201* (2015.05); *A61J 1/1406* (2013.01); *A61J 1/2055* (2015.05); *A61J 1/2065* (2015.05); *A61J 1/2096* (2013.01)

(58) Field of Classification Search
CPC ........ A61J 1/201; A61J 1/2055; A61J 1/2065; A61J 1/1406; A61J 1/2096
See application file for complete search history.

(56) References Cited

U.S. PATENT DOCUMENTS

2005/0124964 A1* 6/2005 Niedospial, Jr. ... B65D 47/2031 604/411
2009/0292271 A1 11/2009 Stepovich et al.
(Continued)

FOREIGN PATENT DOCUMENTS

WO 2008/151431 A1 12/2008
WO 2010/078651 A1 7/2010
(Continued)

OTHER PUBLICATIONS

International Search Report and Written Opinion issued on Jan. 30, 2020 in corresponding International Application No. PCT/CA2019/000157; 14 pages.

*Primary Examiner* — Rebecca E Eisenberg
*Assistant Examiner* — Kate Elizabeth Strachan
(74) *Attorney, Agent, or Firm* — Maier & Maier, PLLC

(57) ABSTRACT

An injector including: a housing having an exterior wall, with pairs of slots formed therein, each pair of slots being diametrically opposed to each other; a needle hub having an exterior wall and an interior wall extending interiorly across the exterior wall, forming upper and lower compartments; a first needle extending upwardly from the interior wall, into the upper compartment, a second needle extending downwardly from the interior wall into the lower compartment, the interior wall having an opening forming a fluid passageway; a first cartridge and a second cartridge, each having a plunger and a pierceable cap; a base member having a base bottom wall with a plunger wall extending upwardly therefrom. The first cartridge is inserted into the base member such that the plunger seats on the plunger rod, and the second cartridge is in the housing with the pierceable cap of the second cartridge facing the first needle.

3 Claims, 16 Drawing Sheets

(56) References Cited

U.S. PATENT DOCUMENTS

| | | | | |
|---|---|---|---|---|
| 2010/0298768 | A1* | 11/2010 | Halili, Jr. | A61M 5/24 604/87 |
| 2011/0166543 | A1* | 7/2011 | Stepovich | A61J 1/1406 604/413 |
| 2014/0025040 | A1* | 1/2014 | Chang | A61J 1/2096 53/471 |
| 2014/0311624 | A1 | 10/2014 | Eilertsen et al. | |
| 2015/0082746 | A1* | 3/2015 | Ivosevic | A61M 5/3286 53/381.1 |
| 2016/0082201 | A1* | 3/2016 | Stillman | A61M 5/46 604/117 |

FOREIGN PATENT DOCUMENTS

| | | | |
|---|---|---|---|
| WO | 2011/050468 | A1 | 5/2011 |
| WO | 2013/134246 | A1 | 9/2013 |
| WO | 2013/134614 | A2 | 9/2013 |

* cited by examiner

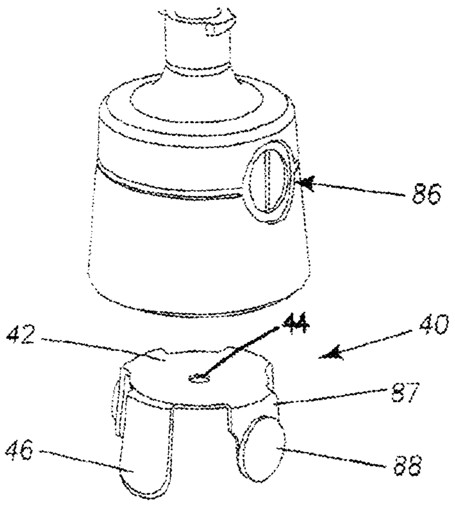
FIG. 17A
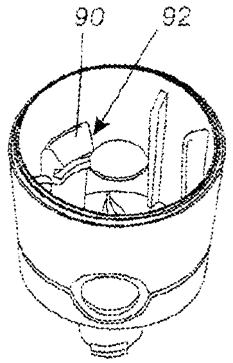
FIG. 17B
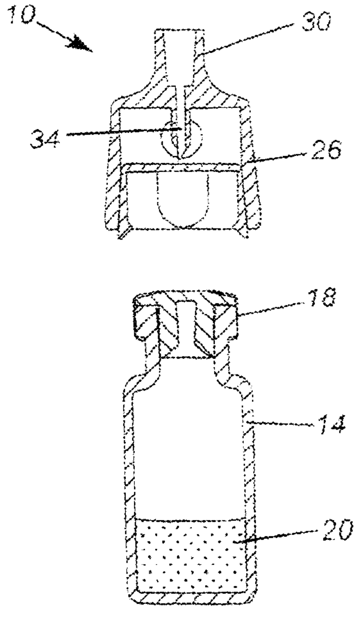
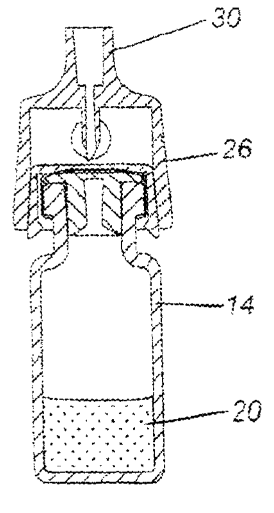
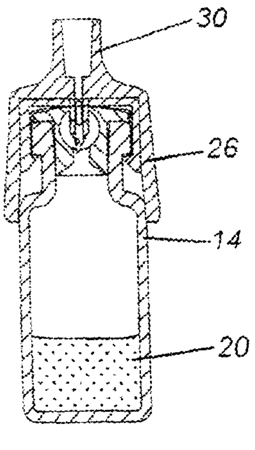
FIG. 17C FIG. 17D FIG. 17E

SECTION A-A

FLUID TRANSFER DEVICE

FIELD

The present invention relates to fluid transfer and more particularly, relates to a method and apparatus for transferring fluid from a first container to a fluid filled second container.

BACKGROUND

The transfer of a liquid or fluid from one container to another is well known in the art and many devices are utilized for facilitating the same. However, in the medical field, substantial care must be utilized in doing so while complying with all the requirements for sterility and the like. One particular problem arises when it is desired to transfer liquid from a first container into a second container and wherein the second container already contains a liquid. The second container is already filled with a liquid and such a container typically will comprise a syringe body which is a glass cylinder having a plunger at one end and a stopper or sealing member at the second end. A needle may optionally be attached. Normally the body has been sterilized along with the plunger and it would not be acceptable procedure to allow the plunger to move into a non-sterile area, as would happen if more fluids were placed in the container. As used herein, the term vial refers to a glass container with a pierceable stopper while a cartridge is a glass container with a pierceable stopper and a plunger.

Transfer of such fluids between containers is required under certain circumstances. An example of one such set of circumstances is when a liquid is utilized for freezing flesh (rendering the flesh insensitive to pain). A typical injection for freezing requires that the liquid to be injected to be acidic. The acidic nature of the liquid subsequently causes pain to the patient. Accordingly, it is desirable to neutralize or buffer the liquid using a compound such as sodium bicarbonate.

SUMMARY

According to the present invention, there is provided a device and method for combining two liquids whereby a portion of a first liquid is permitted to discharge into a storage portion of the device.

BRIEF DESCRIPTION OF THE DRAWINGS

Having thus generally described the invention, reference will be made to the accompanying drawings illustrating an embodiment thereof, in which:

FIG. 17A is an exploded view of the transfer assembly;

FIG. 17B is a bottom perspective view thereof;

FIGS. 17C to 17E show the sequence of placing the transfer assembly on the vial;

DETAILED DESCRIPTION

Figure 1:
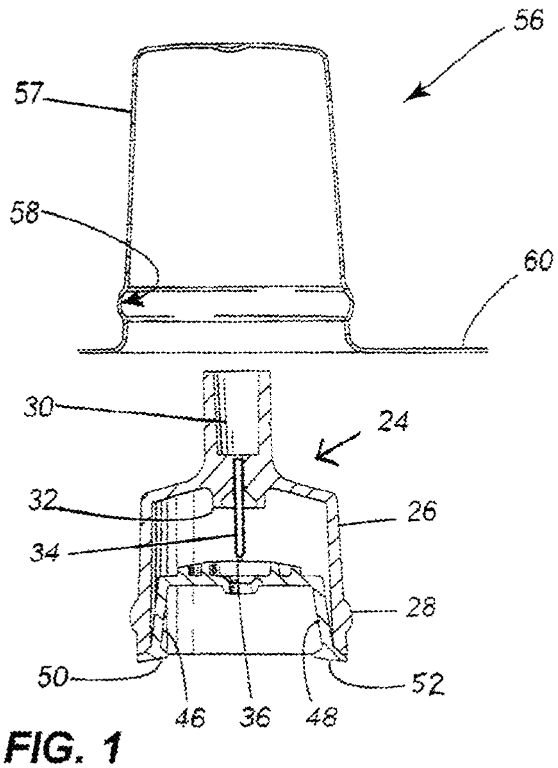
FIG. 1 is a side elevational view of a transfer device according to the present invention.
Figure 2:
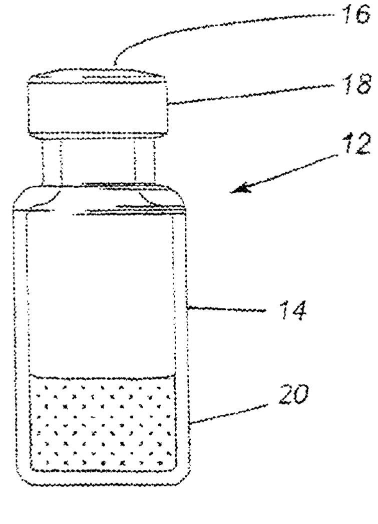
FIG. 2 is a side elevational view, partially in section, of a vial containing a medicant.
Figure 3:
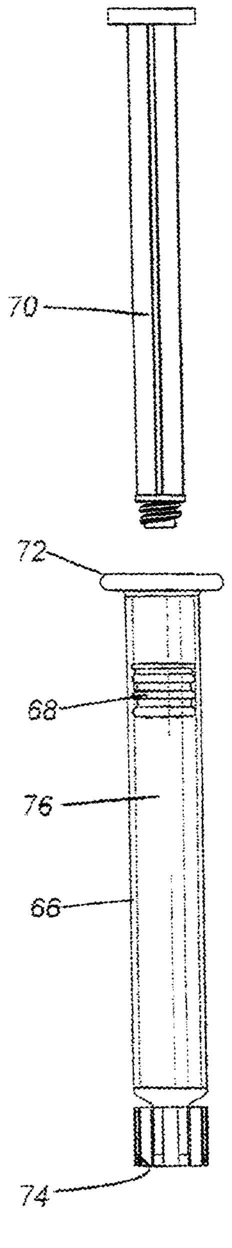
FIG. 3 is a side elevational view of a syringe and plunger rod.
Figure 4:
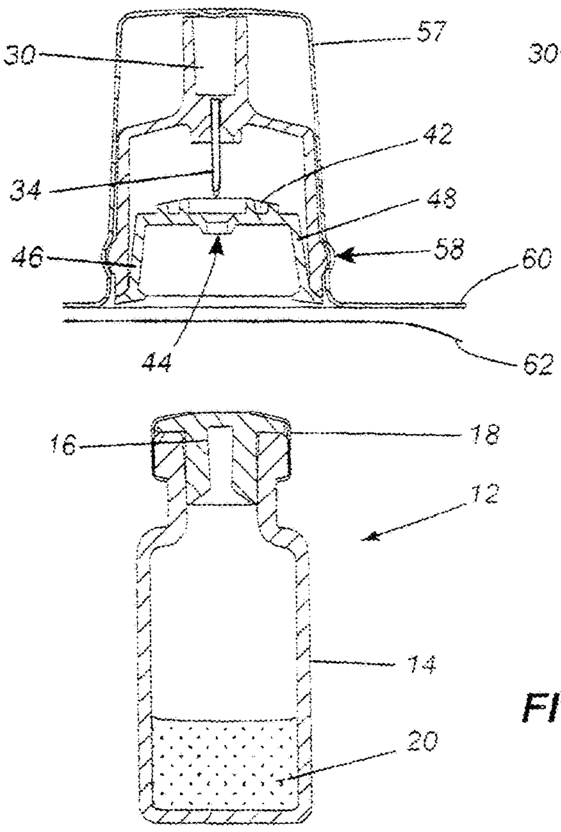
FIG. 4 is a cross sectional view of the transfer device prior to its use.
Figure 5:
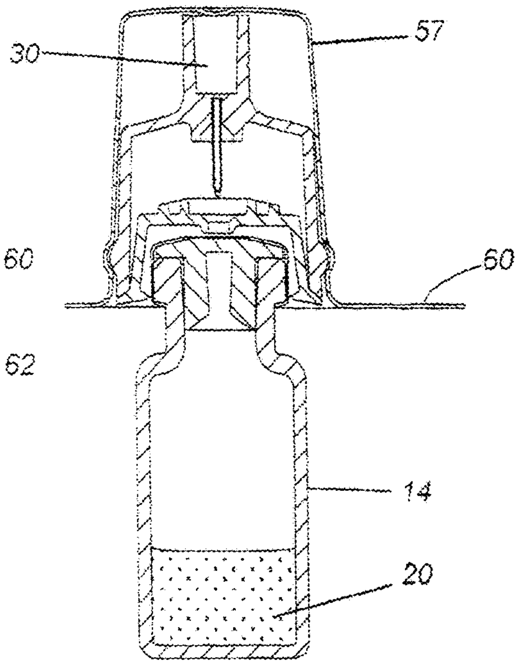
FIG. 5 is a side sectional view of the device being placed on a vial.
Figure 6:
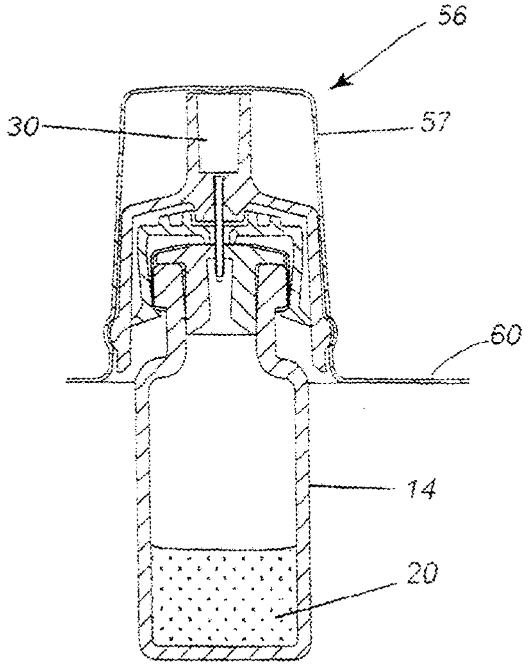
FIG. 6 is a side sectional view showing piercing of the vial.
Figure 7:
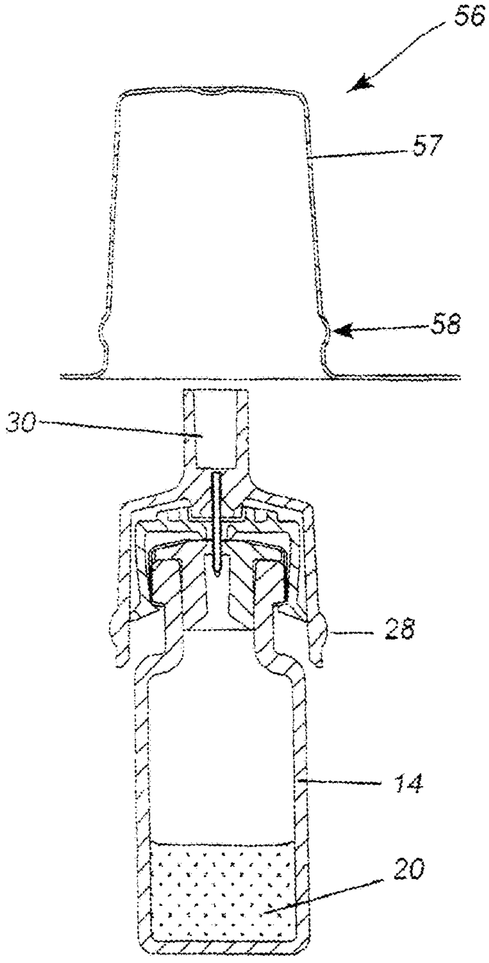
FIG. 7 is a cross sectional view illustrating the cap being removed.

Referring to the drawings in greater detail and by reference characters thereto, there is illustrated a transfer system which is generally designated by reference numeral 10 and which is suitable for use with a vial generally designated by reference numeral 12.

Vial 12 has a body 14 with a neck sealed by a septum 16 over which there is a cap 18. A medicant 20 is contained within body 14 and would typically comprise a dry ingredient although a fluid may also be utilized.

Transfer system 10 includes an outer housing 24 and a circular side wall 26. On circular side wall 26 there is a protrusion 28 near the bottom thereof. On its upper end, there is provided a luer connection 30. An inner wall 32 mounts a needle 34 which is hollow in nature and has a piercing end 36. As previously mentioned, needle 34 may be a spike.

Mounted interiorly of outer housing 24 is a moveable member 40. Moveable member 40 has a top wall 42 with an aperture 44 centrally located therein to permit the passage of needle 34. Extending downwardly from top wall 42 is a first leg 46 and a second leg 48. First leg 46 has an outwardly extending flange 50 at the bottom thereof while second leg 48 also has an outwardly extending flange 52.

A cover 56 is provided to receive transfer system 10. Cover 56 has a side wall 57 with a groove 58 which is adapted to engage with protrusion 28 to retain transfer system 10 in position. Side wall 57 is provided with an outwardly extending flange 60 at the bottom thereof. Flange 60 is designed to receive a peelable sealing strip 62 so as to provide a hermetically sealed package.

The transfer system of the present invention is preferably utilized with a cartridge which has a syringe body 66 and a plunger 68 mounted therein. A plunger rod 70 is designed to be screwthreadably engageable with plunger 68. Syringe body 66 includes a backstop 72 to permit proper gripping by the hand of a user. At its front end, syringe body 66 includes a luer connector 74. Typically, syringe body 66 is filled with a diluent 76 although any desired fluid may be utilized.

Figure 8:
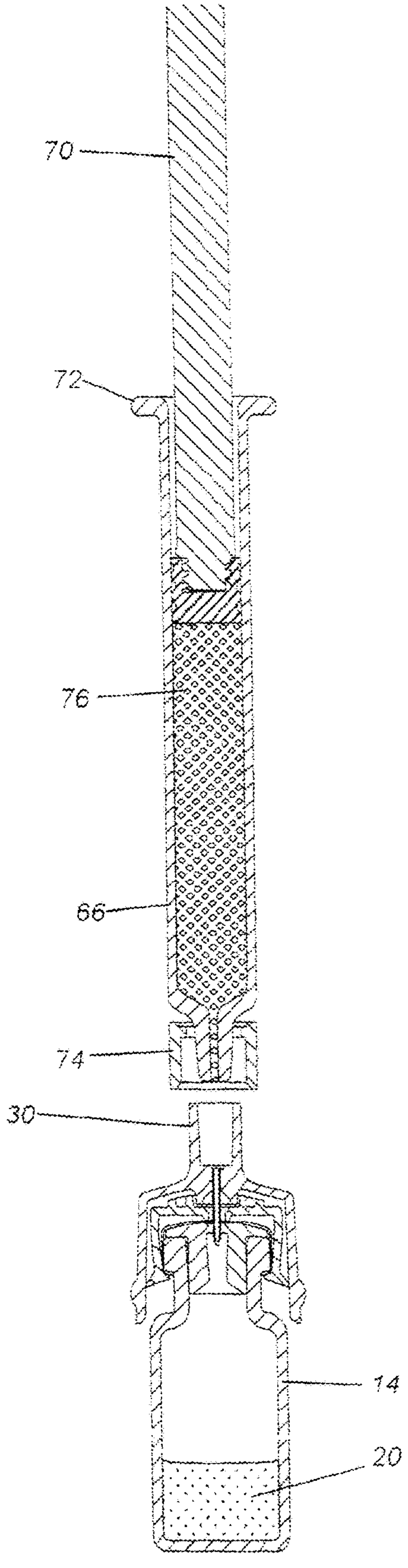
FIG. 8 is a view, partially in cross section, of a syringe being attached to the transfer device.
Figure 9:
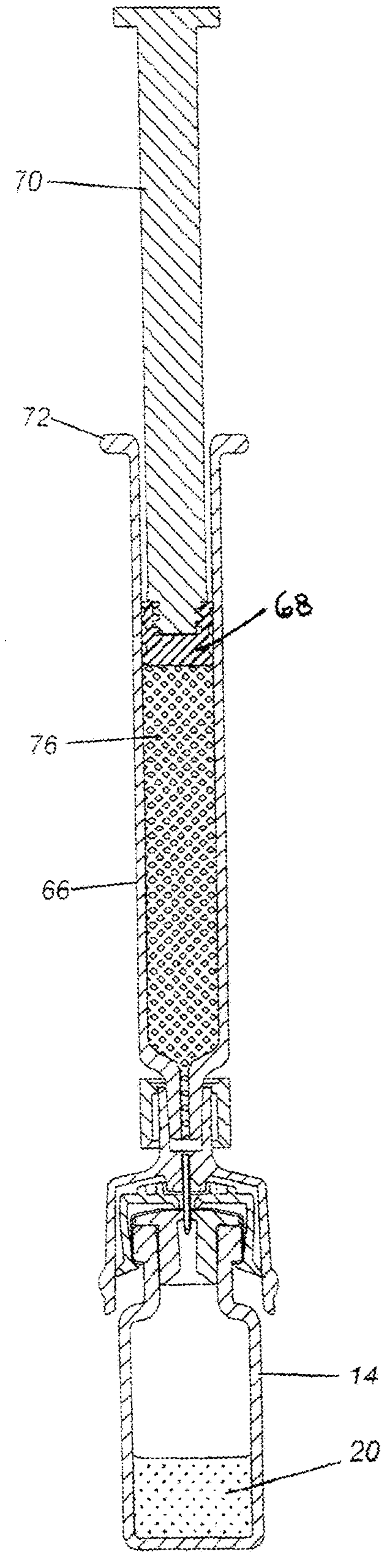
FIG. 9 is a cross sectional view illustrating a syringe being ready to be placed on the vial.
Figure 10:
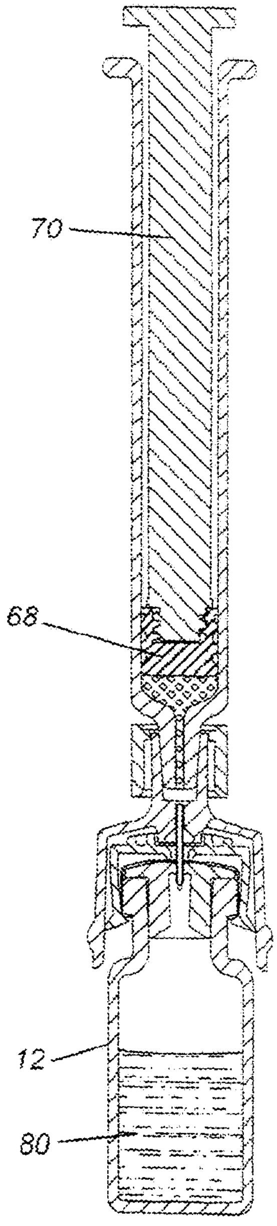
FIG. 10 is a cross sectional view illustrating the syringe attached to the vial.
Figure 11:
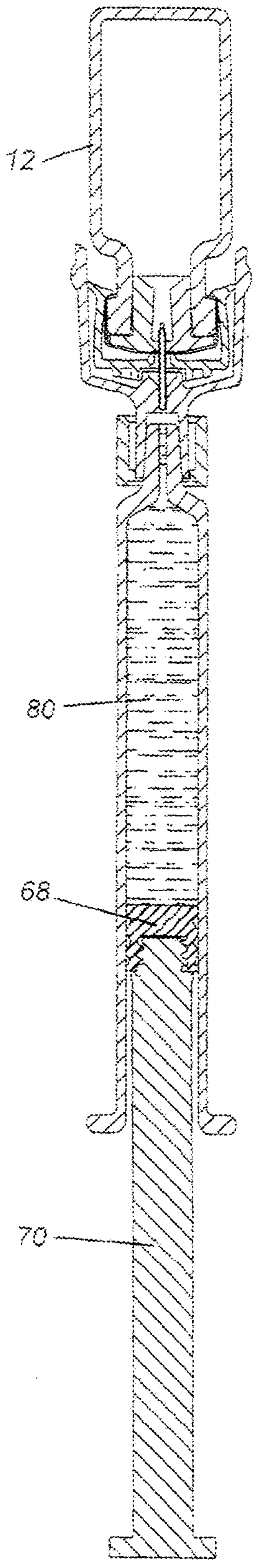
FIG. 11 is a sectional view illustrating the mixing of components.
Figure 12:
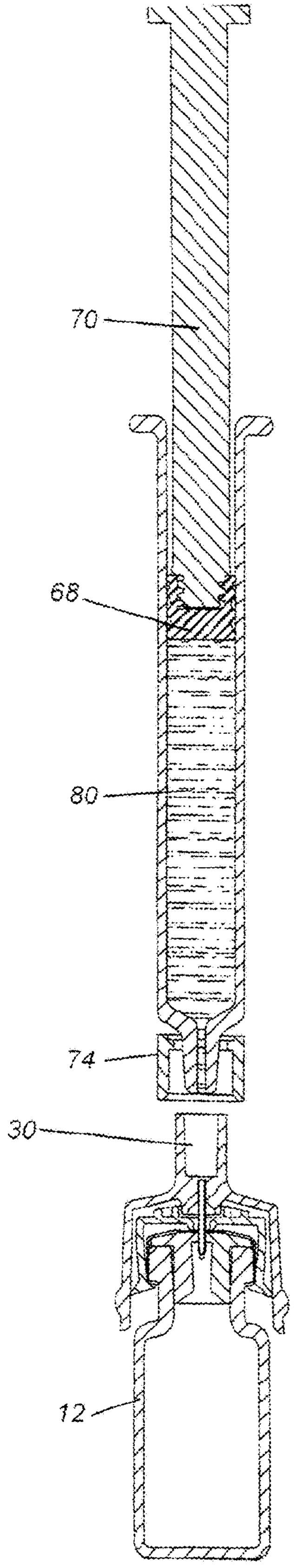
FIG. 12 is a sectional view illustrating the aspiration of the mixture into the syringe.
Figure 13:
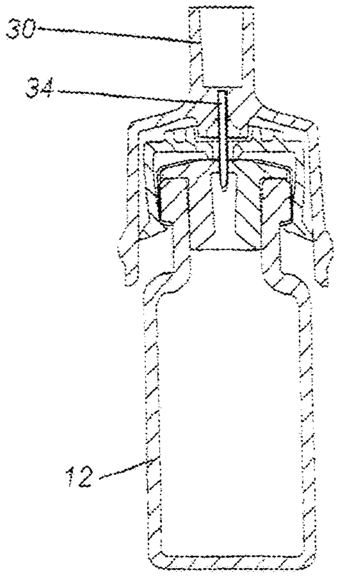
FIG. 13 is a cross sectional view illustrating placement of the transfer assembly on a vial.
Figure 14:
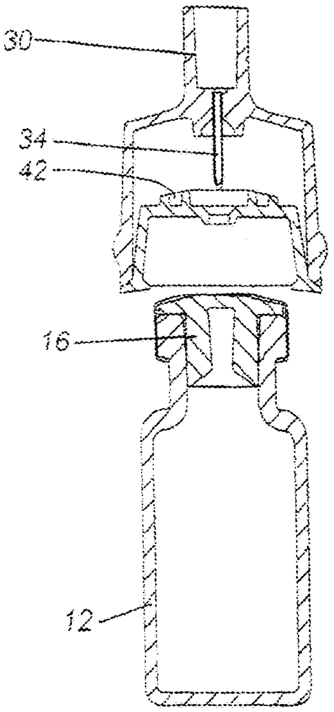
FIG. 14 is an exploded view illustrating the transfer assembly and the vial prior to insertion of the vial.
Figure 15A:
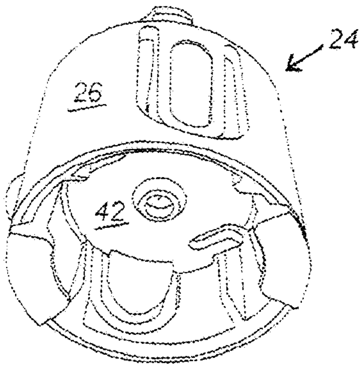
FIG. 15A is a bottom perspective view of a transfer assembly according to one embodiment of the present invention.
Figure 16A:
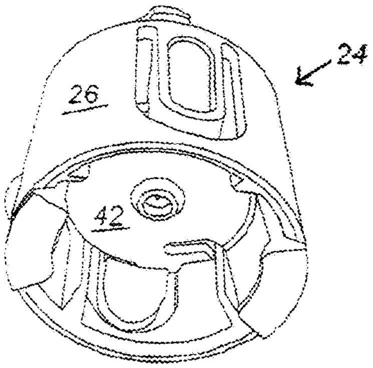
FIG. 16A is a perspective view of the transfer assembly according to a further embodiment.
Figure 15B:
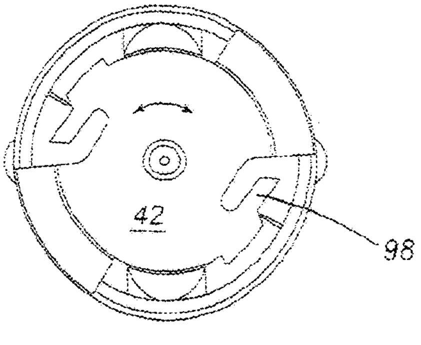
FIG. 15B is a bottom plan view thereof.
Figure 16B:
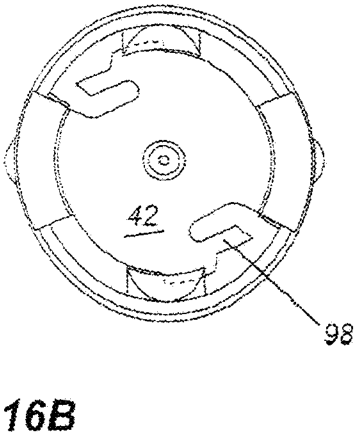
FIG. 16B is a bottom plan view thereof.
Figures 17F, 17G, 17H:
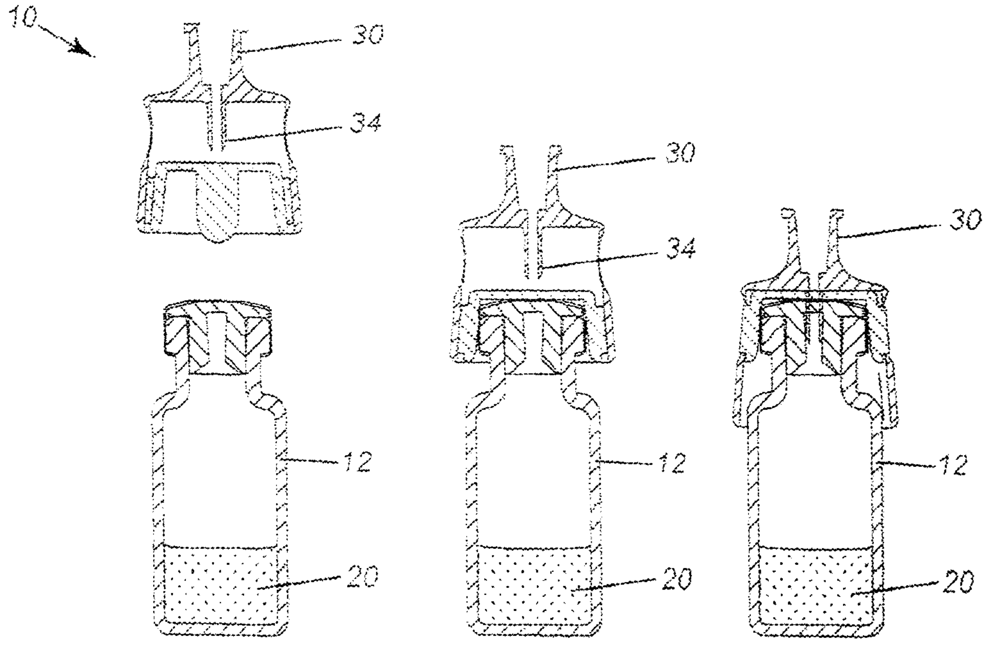
FIGS. 17F to 17H illustrate the placement of the transfer assembly in a further embodiment thereof on a vial.

As shown in FIGS. 8 and 9, plunger rod 70 is connected to plunger 68 and the diluent 76 is then forced into vial body 14 as shown in FIG. 10. The medicant and diluent may then be mixed and the assembly inverted as shown in FIG. 11. The mixture 80 is then aspirated back into syringe body 66. The mixture 80 is then ready for injection when a needle assembly is connected to luer connector 74.

In the embodiment of FIGS. 17A to 17H, it will be noted that outer housing 24 is provided with a pair of apertures 86 in side wall 26. Also, in this embodiment, there are provided an extra pair of legs 87 each having buttons 88 formed on an exterior surface thereof. In this embodiment, when the moveable member 40 moves upwardly, buttons 88 engage in apertures 86.

On the interior surface of wall 26, there are provided ribs 90 which have a groove 92 formed therein. Thus, when pressure is exerted on buttons 86 as vial 12 is being withdrawn, moveable member 40 will move downwardly until the top wall 42 engages with groove 92. This retains moveable member 40 in position for further use.

Figure 18:
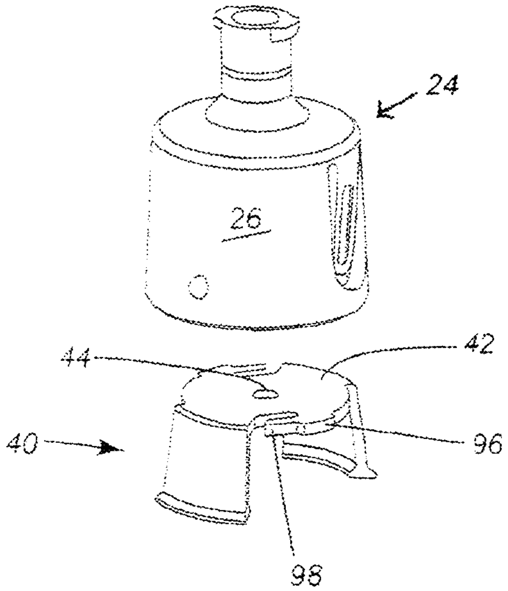
FIG. 18 is an exploded view of the transfer assembly.
Figure 19A:
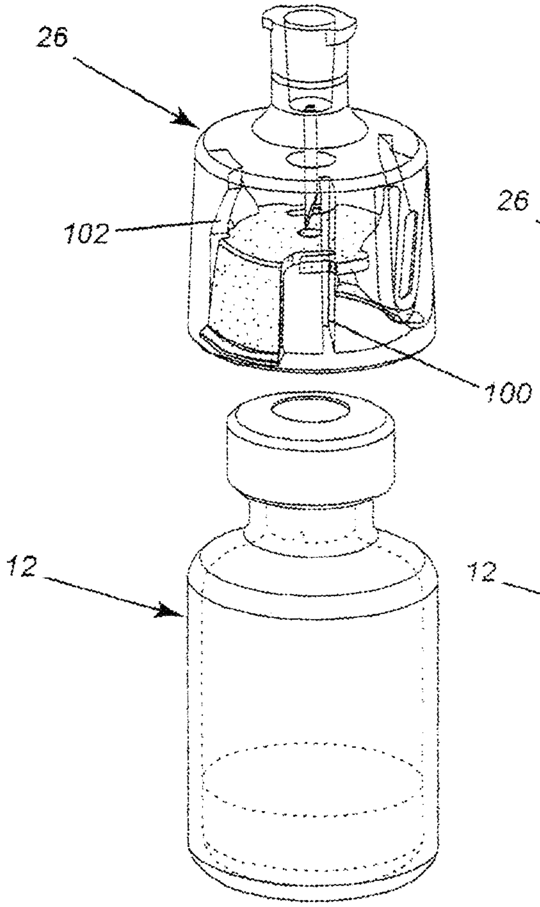
FIGS. 19A to 19D are perspective views illustrating placement of the transfer assembly on a vial and removal thereof.
Figure 19B:
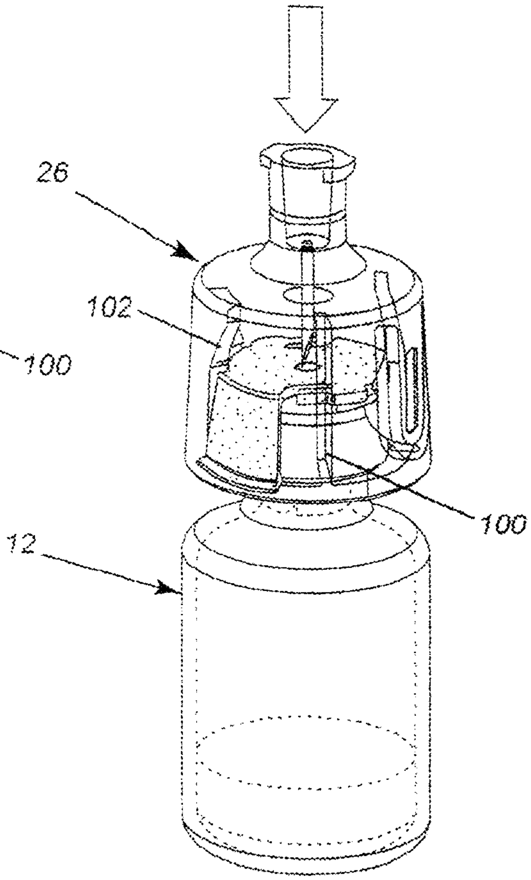
Figure 19C:
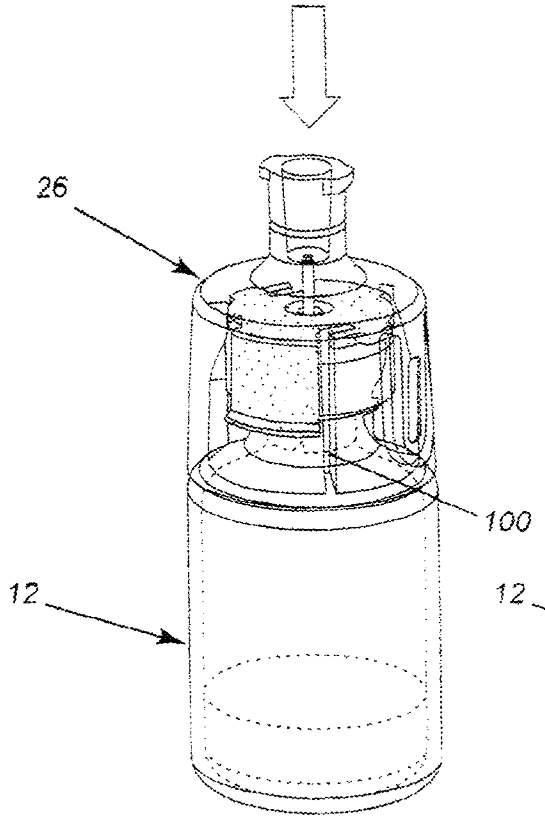
Figure 19D:
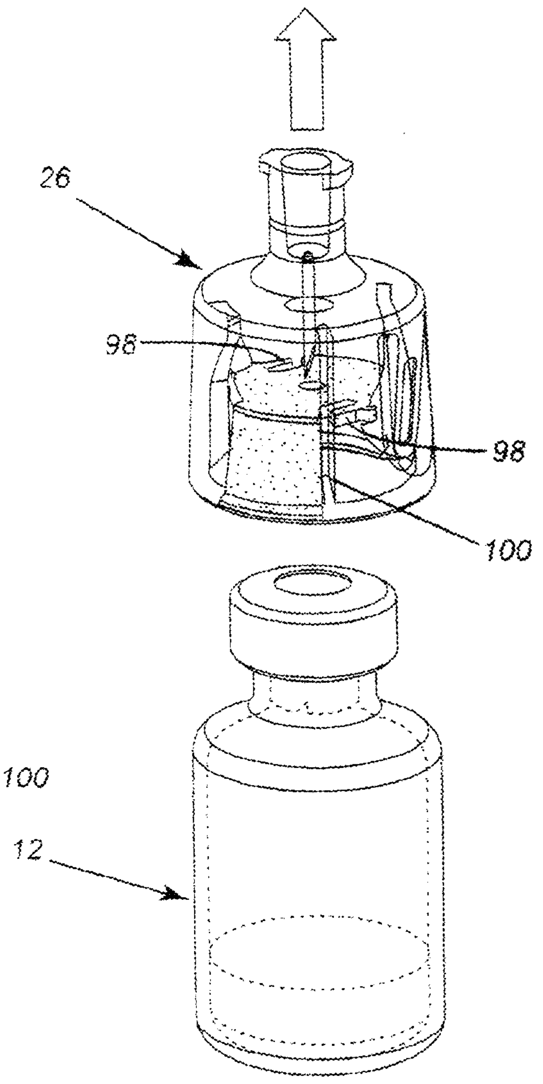

In the embodiment of FIGS. 18 to 19D, it will be noted that top wall 42 is provided with protrusions 96 and locking latches 98. On the interior there are provided ribs 100 and angled side wall portions 102. The arrangement is such that upon upward movement of moveable member 40, protrusions 96 engage with angled side wall 102 to rotate moveable member 40. Upon withdrawal, locking latches 98 engage with rib 100 so as to prevent further use of the transfer member.

Figure 20A:
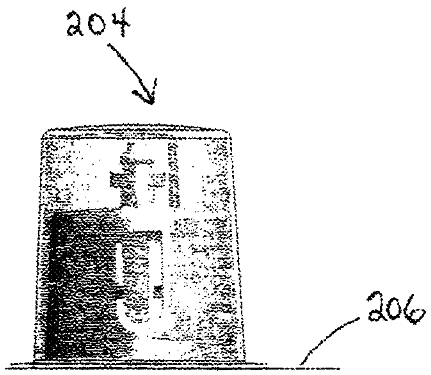
FIG. 20A is a side elevational view of a transfer assembly when packaged.
Figure 20B:
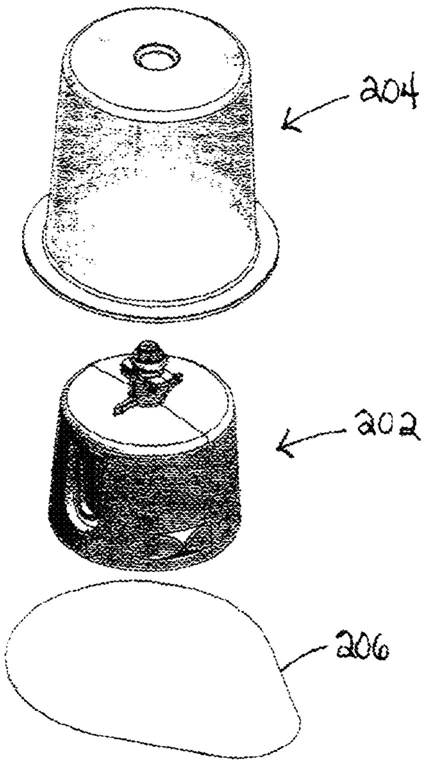
FIG. 20B is an exploded view thereof.

As shown in FIGS. 20A and 20B, the transfer assembly will comprise the transfer device 202 as previously described herein. A cover 204 is mounted over transfer device 202 and a removable seal 206 applied.

Figure 21:
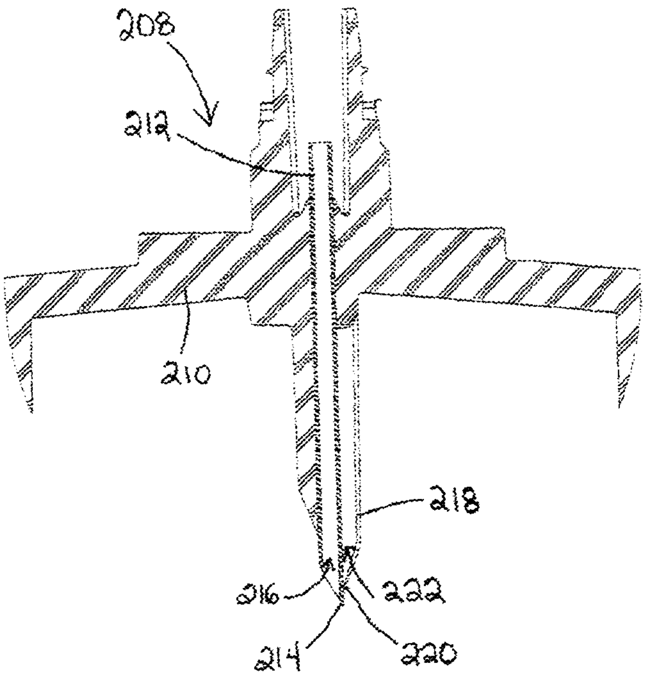
FIG. 21 is a cross sectional view of the needle assembly of the transfer assembly.
Figure 22:
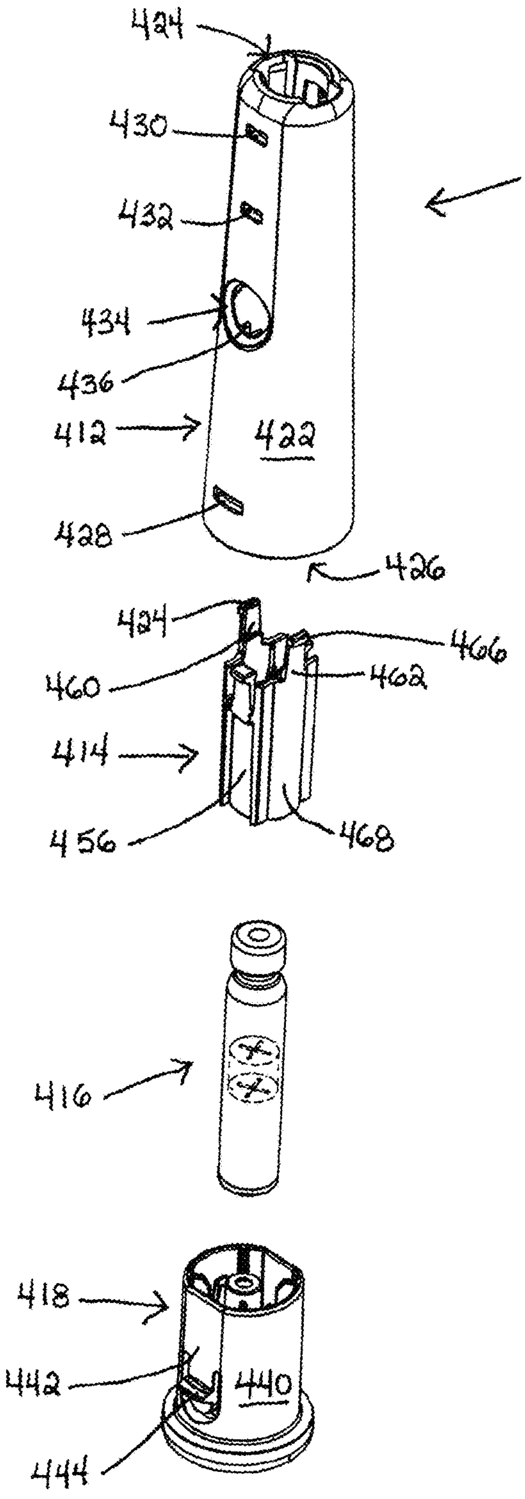
FIG. 22 is an exploded view of the injector according to an embodiment of the present invention.
Figure 23:
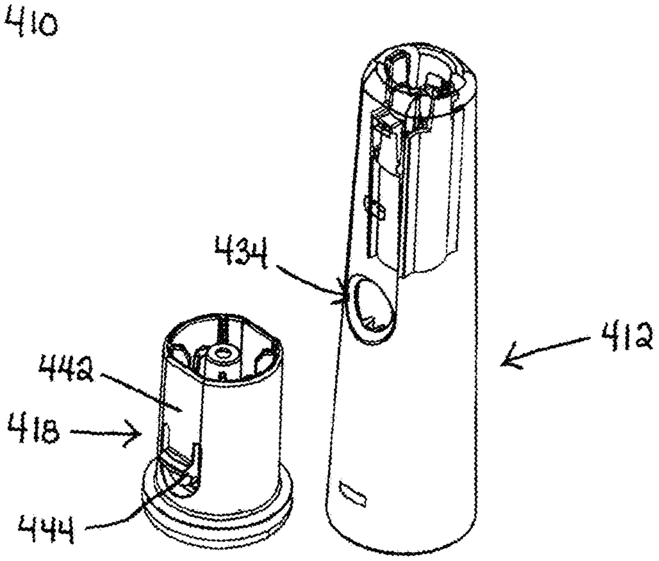
FIG. 23 illustrates the outer housing and the base member of the injector of FIG. 22.
Figure 24:
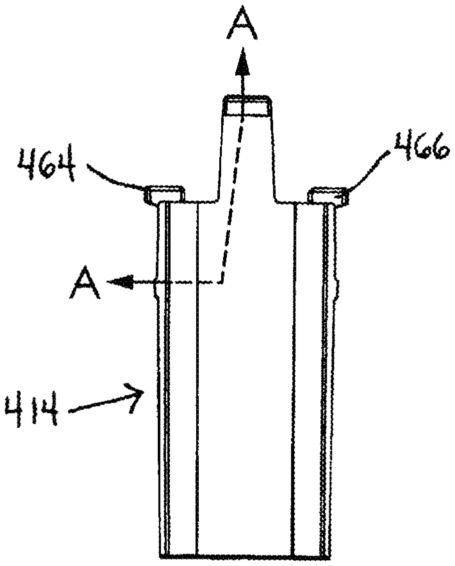
FIG. 24 is a side elevational view of the base member.
Figure 25:
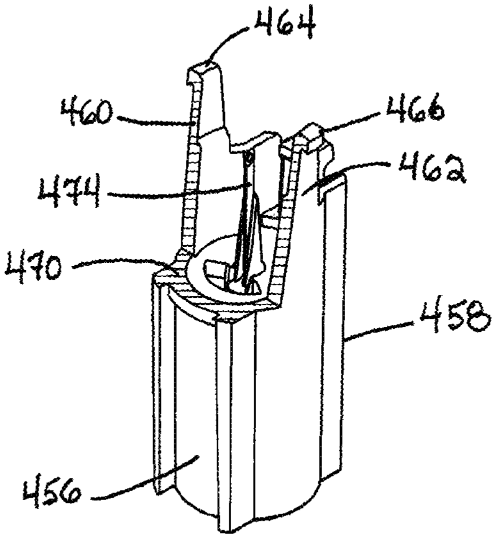
FIG. 25 is a sectional view taken along the lines A-A of FIG. 24.
Figure 28B:
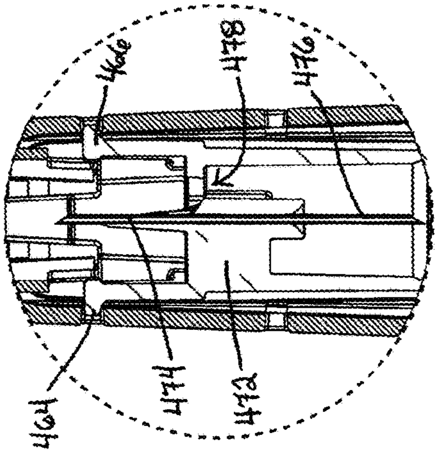
FIG. 28B is an enlarged view of the sectional line shown in dashed lines of FIG. 28A.
Figure 28A:
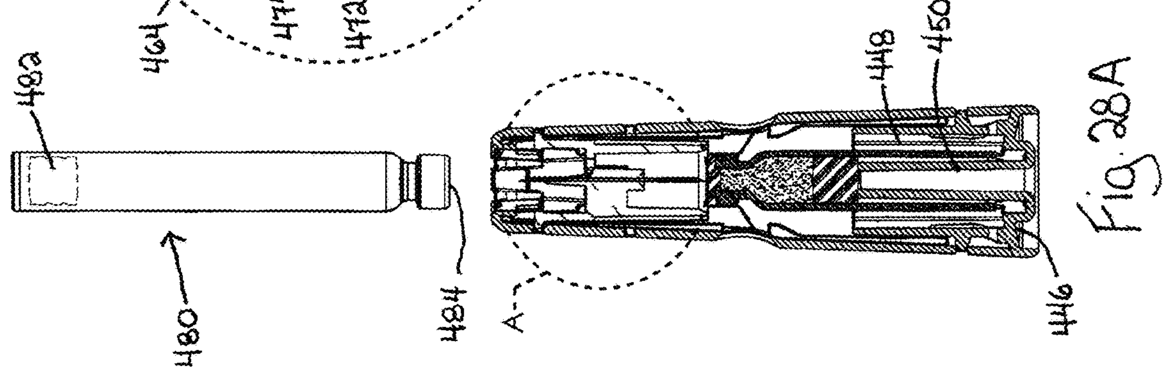
FIG. 28A is a sectional view of the lower portion of the injector with a cartridge being inserted therein.
Figure 27B:
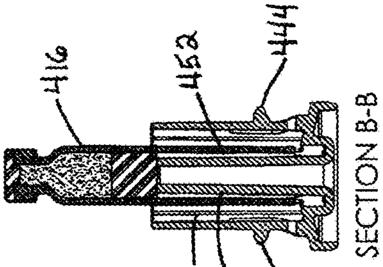
FIG. 27B is a sectional view taken along the lines B-B of FIG. 27A.
Figure 27A:
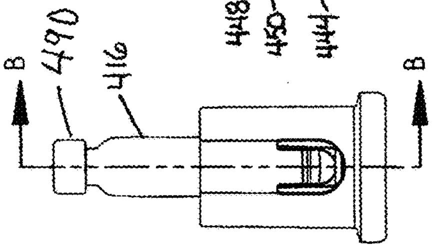
FIG. 27A is a side elevational view of the base member and cartridge inserted therein.
Figure 26:
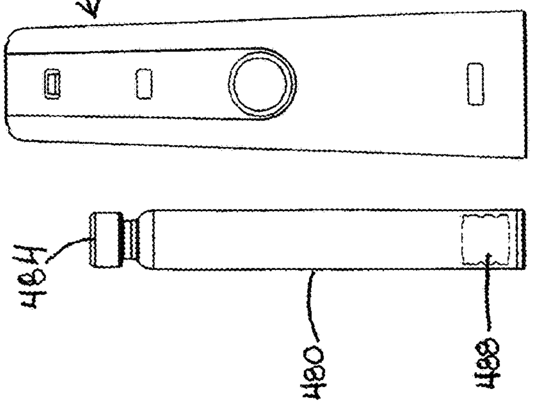
FIG. 26 is a side elevational view of a second cartridge and the outer housing.

The transfer device includes a needle assembly generally designated by reference numeral 208 and thus seen in FIG. 21. A portion of the body 210 has a needle 212 extending therethrough. Needle 212 is of a metallic material and is over molded with body portion 210. Needle 212 includes a piercing tip 214 and a needle passageway 216 extends therethrough. A plastic spike 218 is formed as a portion of needle 212. The plastic spike has a piercing tip 220 with a spike venting passageway 222 formed therein. As may been seen, needle passageway 216 and spike venting passageway 222 lie side by side with a portion of needle 212 forming one wall of spike venting passageway 222. Both needle piercing tip 214 and spike piercing tip 220 are angled to provide the best piercing capability. Both tips are sharpened as is known in the art.

It will be noted that needle passageway 216 extends a little bit further down than the opening to spike venting passageway 222. In use, spike passageway 216 is utilized for transfer of the drug or liquid into a further container, while spike venting passageway 222 permits the egress of either a gas or a liquid therefrom. When transferring from one container to another, a liquid in the second container will exit through spike venting passageway 222 to permit equalization of pressures and to allow the liquid transferred through needle passageway 216 to flow smoothly into the second container.

Referring now to the embodiment illustrated in FIGS. 22 to 31B, there is illustrated an injector generally designated by reference numeral 410.

Fluid transfer 410 includes an outer housing generally designated by reference numeral 412, a needle hub generally designated by reference numeral 414, a cartridge generally designated by reference numeral 416, and a base member generally designated by reference numeral 418.

Outer housing 412 is defined by a slightly oblong wall 422. Outer housing 412 has an open top 424 and an open bottom 426. A pair of lower slots 428 are provided diametrically opposite each other. Located in the upper portion of wall 422 are a pair of diametrically opposed upper slots 430 and a pair of diametrically opposed intermediate slots 432. Wall 422 also has a pair of circular apertures 438 formed in a diametrically opposed pattern. On the interior of wall 422, there are provided diametrically opposed inferior ribs 436.

Base member 418 also has an overall oblong configuration with a side wall 440 and tabs 442, the tabs 442 being diametrically opposed. On each of tabs 442, there is an outwardly extending protrusion 444. Base member 18 also includes a bottom wall 446. Interiorly of side wall 440, there are provided corner ribs 448 with corner ribs being located proximate the corners of base member 418.

Extending upwardly from bottom wall 446 is a plunger rod 50. A pair of guide members 452 are provided, one on each side of plunger rod 450.

Needle hub 414 includes a first side wall 456 and a second side wall 458. Each side wall 456, 458 includes a relatively planar outer edge and an arcuate inner portion between the planar portions. Extending upwardly from side wall 456 is an upper tab 460 while upper tab 462 extends from side wall 58. A protrusion 64 is provided on upper tab 460 and a protrusion 466 is provided on upper tab 462. Needle hub 414 also includes opposed end walls 468, 470. An intermediate wall 472 is provided. Intermediate wall 472 does not extend complete across between end walls 468, 470, and side walls 456, 458 to thereby leave a passageway 478 therein. Mounted on one side of intermediate wall 472 is an upper needle 474 while a lower needle 476 is mounted on the other side of intermediate wall 472.

Figure 30B:
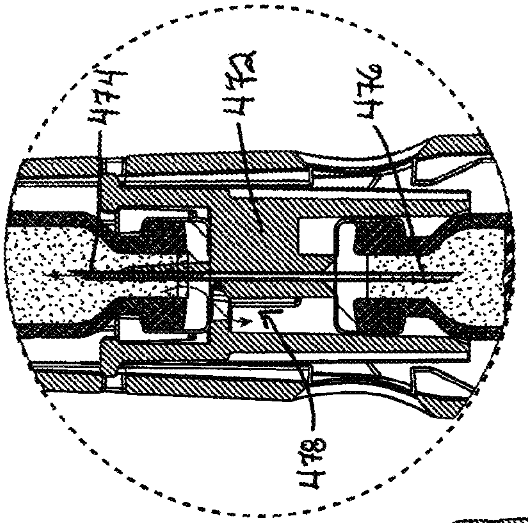
FIG. 30B is an enlarged view of the portion shown in dashed lines of FIG. 30A.
Figure 30A:
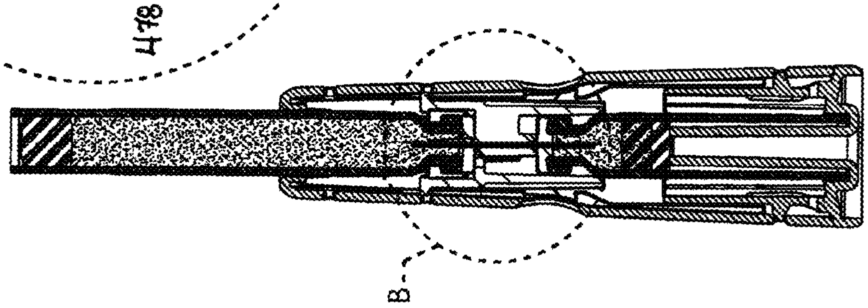
FIG. 30A is a sectional view illustrating piercing of the cartridges.
Figure 29:
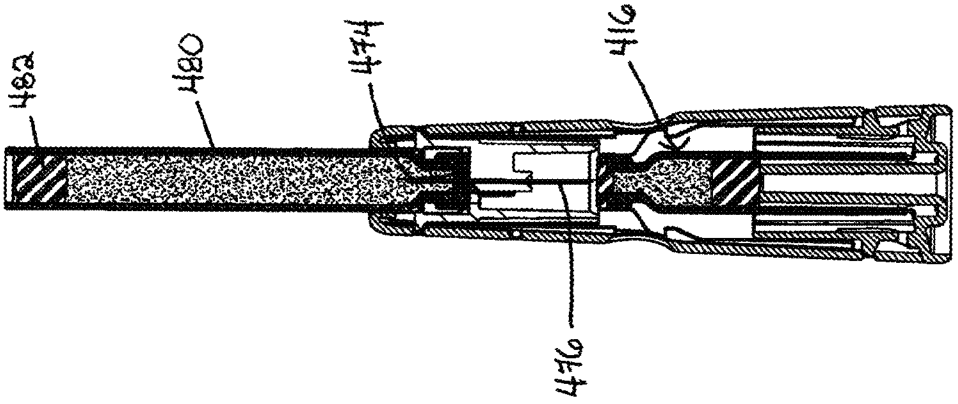
FIG. 29 is a sectional view illustrating advancement of the cartridge into the injector.
Figure 31B:
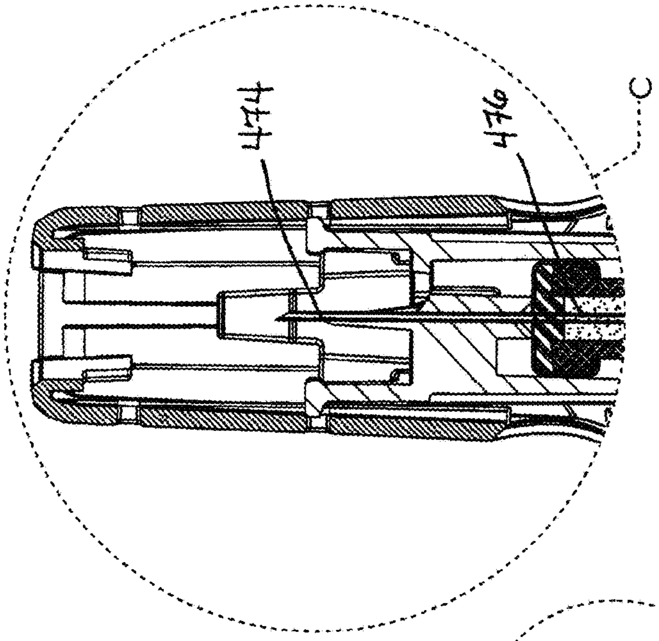
FIG. 31B is an enlarged view of the portion shown in dashed lines of FIG. 31A.
Figure 31A:
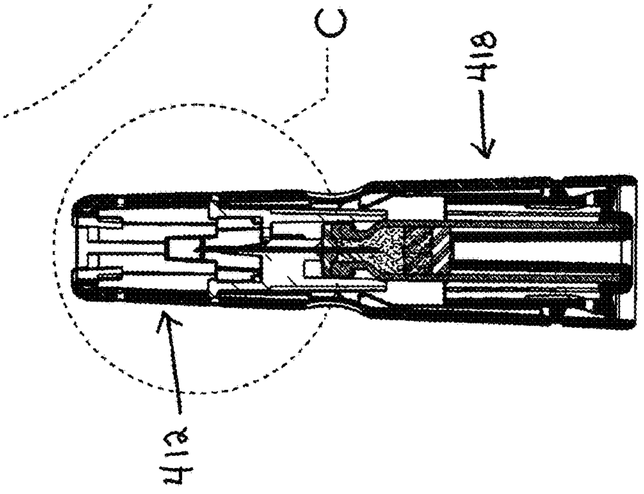
FIG. 31A illustrates the final step of the piercing with removal of the cartridge therefrom.

As may be seen in the drawings, first cartridge 416 is placed within base member 414 such that plunger 488 seats on plunger rod 450, while a pierceable cap 490 is facing upwardly. Subsequently, outer housing 412 has first cartridge 416 placed therein and needle hub 414 inserted such that protrusions 464, 466 of upper tabs 460, 462 limit movement to prevent excess movement. Downward pressure on outer housing 412 and first cartridge 416 results in the piercing of pierceable caps 484 and 490 as shown in FIGS. 29, 30A and 30B. This will result in the transfer of liquid within first cartridge 416 to second cartridge 480. Excess liquid is allowed to flow through passageway 478 due to the venting needle as previously described.

It will be understood that the above described embodiment is for purposes of illustration only and that changes and modifications may be made thereto without departing from the spirit and scope of the invention.

We claim:

1. A fluid transfer device comprising:

a housing having an exterior wall, a plurality of pairs of slots formed in said exterior wall, each one of said pairs of slots being diametrically opposed to each other;

a needle hub having an exterior wall and an interior wall extending interiorly across said exterior wall, to thereby form upper and lower compartments, a first needle extending upwardly from said interior wall, into said upper compartment, a second needle extending downwardly from said interior wall into said lower compartment, said interior wall having an opening therein to form a fluid passageway, wherein the exterior walls include a planar outer edge and an arcuate inner portion between the planar outer edges;

a first cartridge having a plunger and a pierceable cap;

a second cartridge having a plunger and a pierceable cap;

a base member, said base member having an upper end configured to receive the first cartridge, a lower end having a base bottom wall, said upper end and said lower end being opposite ends of said base member, and a plunger rod extending upwardly from said base bottom wall such that said plunger rod is fixedly secured to said base bottom wall and that said plunger rod extends towards the upper end; and said arrangement being such that said first cartridge is inserted into said base member at the upper end such that said plunger seats on said plunger rod, and said second cartridge is in said housing with said pierceable cap of said second cartridge facing said first needle.

2. The fluid transfer device of claim 1, wherein said needle hub includes first and second upper tabs, each of said upper tabs having a protrusion extending outwardly therefrom, said protrusions being arranged to engage with one of said pairs of slots formed in said housing.

3. The fluid transfer device of claim 1, wherein said first needle has a spike adjacent thereto, said spike and said first needle having a common wall therebetween.

* * * * *